(12) United States Patent
Mizukami et al.

(10) Patent No.: US 10,180,149 B2
(45) Date of Patent: Jan. 15, 2019

(54) CONTROL VALVE DEVICE

(71) Applicant: KYB Corporation, Tokyo (JP)

(72) Inventors: Syota Mizukami, Kanagawa (JP); Takeshi Terao, Kanagawa (JP)

(73) Assignee: KYB Corporation, Tokyo (JP)

( * ) Notice: Subject to any disclaimer, the term of this patent is extended or adjusted under 35 U.S.C. 154(b) by 107 days.

(21) Appl. No.: 15/120,907

(22) PCT Filed: Feb. 25, 2015

(86) PCT No.: PCT/JP2015/055459
§ 371 (c)(1),
(2) Date: Aug. 23, 2016

(87) PCT Pub. No.: WO2015/162993
PCT Pub. Date: Oct. 29, 2015

(65) Prior Publication Data
US 2016/0363140 A1    Dec. 15, 2016

(30) Foreign Application Priority Data

Apr. 25, 2014 (JP) .................................. 2014-091671

(51) Int. Cl.
| | |
|---|---|
| *F15B 13/04* | (2006.01) |
| *F15B 13/02* | (2006.01) |
| *F16K 17/02* | (2006.01) |
| *F16K 11/07* | (2006.01) |
| *F16K 27/04* | (2006.01) |

(52) U.S. Cl.
CPC ........ *F15B 13/0402* (2013.01); *F15B 13/024* (2013.01); *F16K 11/07* (2013.01); *F16K 17/02* (2013.01); *F16K 27/041* (2013.01); *F15B 2013/041* (2013.01); *F15B 2211/41581* (2013.01); *F15B 2211/50518* (2013.01); *F15B 2211/5159* (2013.01); *Y10T 137/8671* (2015.04)

(58) Field of Classification Search
CPC ................ F16B 13/0402; F16B 13/024; F16B 2211/41581; F16B 2211/5159; F16B 2211/50518; F16B 2013/041; F16K 11/07; F16K 27/041; F16K 17/02
See application file for complete search history.

(56) References Cited

U.S. PATENT DOCUMENTS 6,212,886 B1 *  4/2001  Sugiyama ............. E02F 9/2225
                                              60/422

FOREIGN PATENT DOCUMENTS

| CN | 201187492 Y | 1/2009 |
|---|---|---|
| JP | 11-230106 A | 8/1999 |
| JP | 2009-209999 A | 9/2009 |

\* cited by examiner

*Primary Examiner* — William McCalister
*Assistant Examiner* — Patrick Williams
(74) *Attorney, Agent, or Firm* — Rabin & Berdo, P.C.

(57) ABSTRACT

A control valve device includes a valve body having an actuator port connected to an actuator and a relief passage configured to allow the actuator port to communicate with a return passage, a spool slidably assembled into the valve body and configured to allow the actuator port to selectively communicate with a supply side or a return side, a relief valve configured to open/close the relief passage to control pressure of the actuator port, and an on/off valve assembled into an assembling hole which is formed in the valve body. The on/off valve configured to allow the actuator port to communicate with the relief passage through the assembling hole at the time of valve open.

5 Claims, 9 Drawing Sheets

CONTROL VALVE DEVICE

TECHNICAL FIELD

The present invention relates to a control valve device including an on/off valve for returning working fluid in an actuator to a tank.

BACKGROUND ART

This type of control valve device is conventionally known as disclosed in JP2009-209999A for example. In this conventional control valve device, a sub-block is separately provided in a valve body, and the on/off valve is provided in this sub-block.

SUMMARY OF INVENTION

In the conventional control valve device including the on/off valve provided in the sub-block as described above, the sub-block has to be separately provided. Thus, there is a problem that the number of parts is increased for the sub-block and the entire control valve device is enlarged.

An object of the present invention is to provide a control valve device in which an on/off valve can be provided without adding a sub-block as in the conventional example.

According to one aspect of the present invention, a control valve device includes a valve body having an actuator port and relief passage, a spool slidably assembled into the valve body and configured to allow the actuator port selectively to communicate with a supply side or a return side, a relief valve configured to open/close the relief passage to control pressure of the actuator port, and an on/off valve assembled into an assembling hole which is formed in the valve body. The on/off valve is configured to allow the actuator port to communicate with the relief passage through the assembling hole at the time of valve open.

DESCRIPTION OF EMBODIMENTS

First Embodiment

Figure 1:
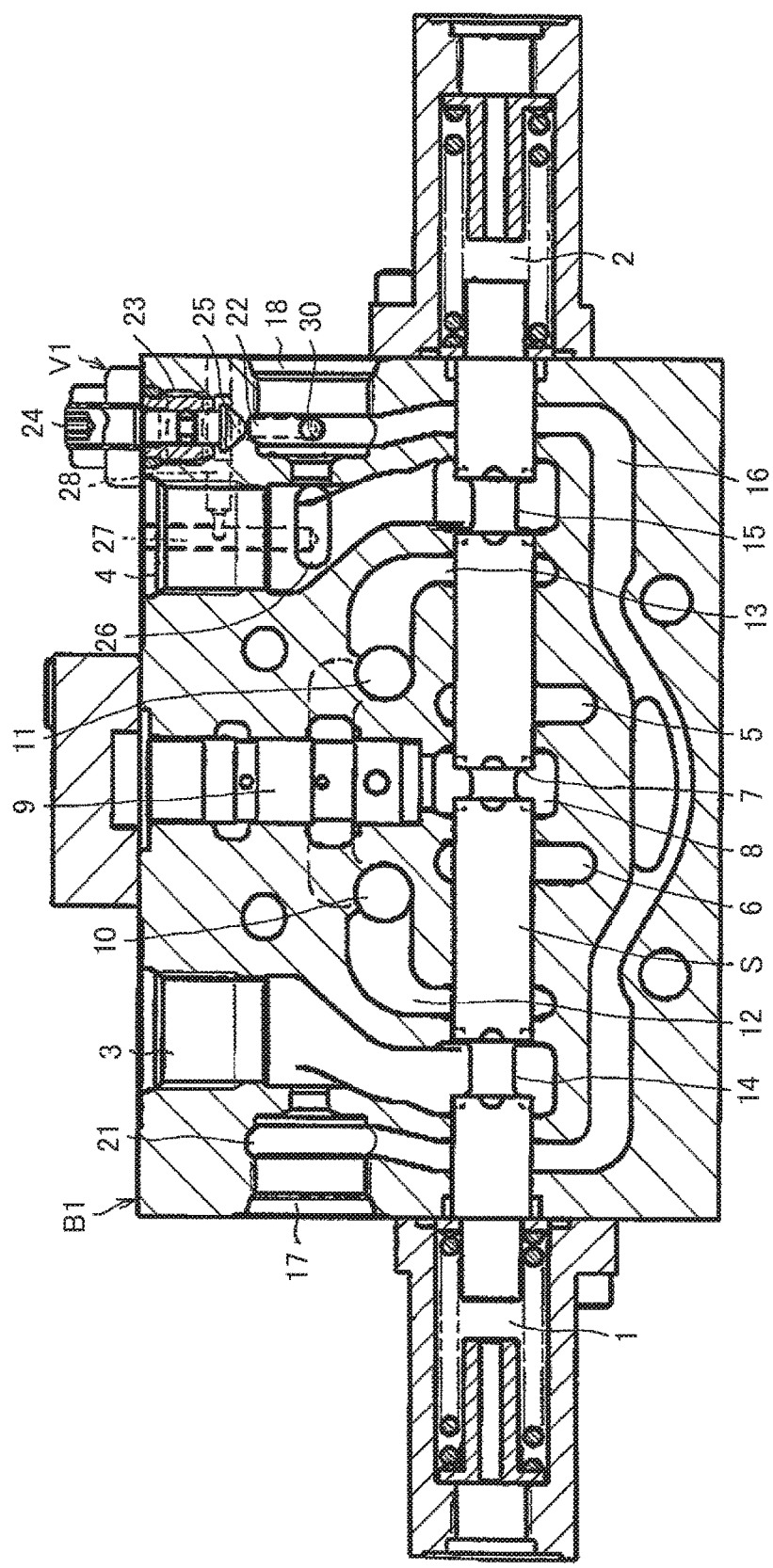
FIG. 1 is a sectional view of a first embodiment in a state where relief valves are detached.
Figure 2:
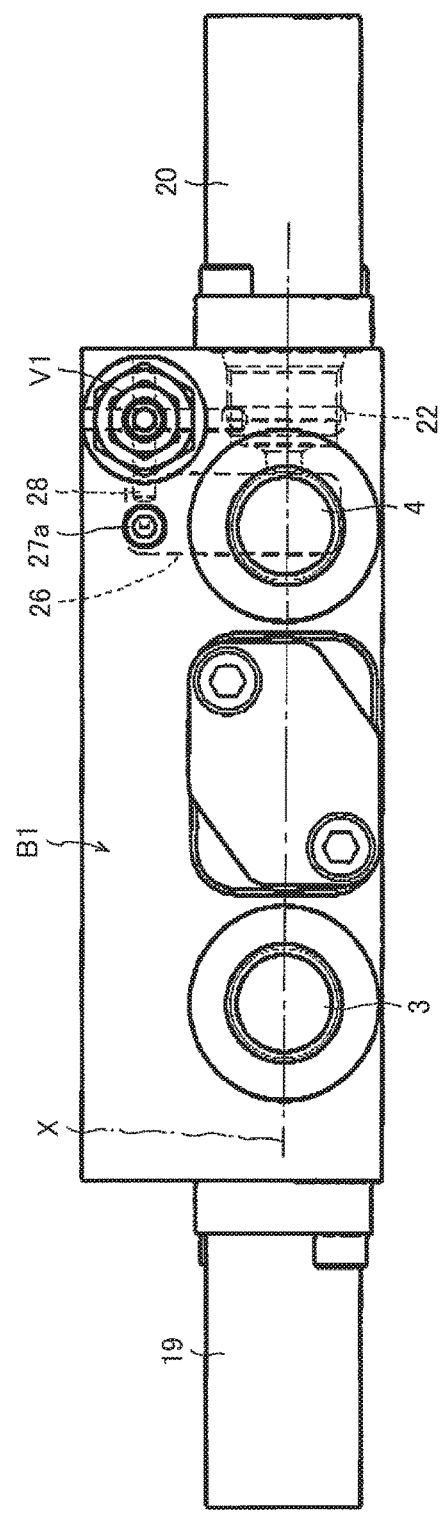
FIG. 2 is a plan view of the first embodiment in a state where the relief valves are attached, the view being seen from the opening side of actuator ports.
Figure 3:
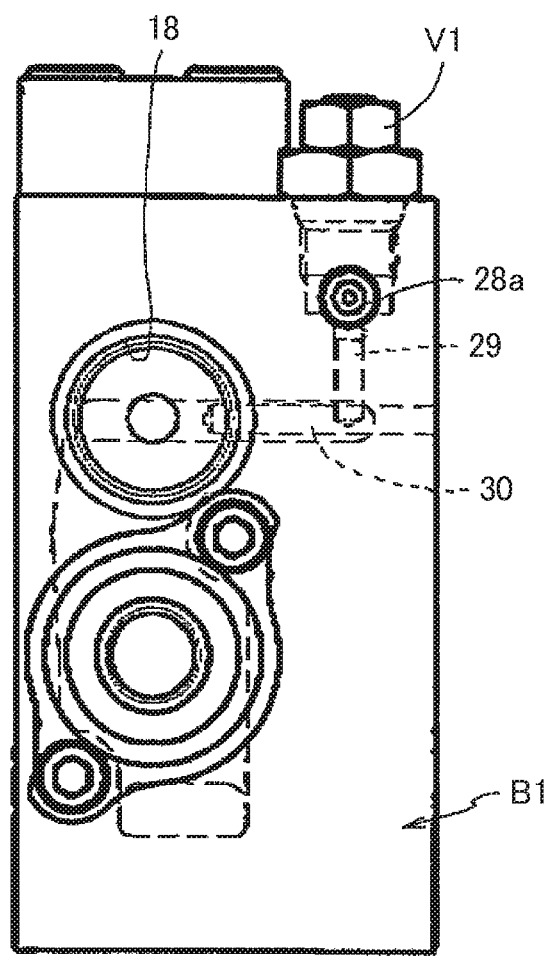
FIG. 3 is a side view of the first embodiment in a state where the relief valves are attached, the view being seen from the relief valve side.

In a first embodiment shown in FIGS. 1 to 3, a spool S is slidably assembled into a valve body B1. Both ends of the spool S face pilot chambers 1, 2.

Actuator ports 3, 4 are formed in the valve body B1. For example, the one actuator port (second actuator port) 3 communicates with a rod side chamber of a cylinder (not shown), and the other actuator port (first actuator port) 4 communicates with a bottom side chamber of the cylinder.

When the spool S is switched for example in the right direction from a neutral position shown in the figure, working fluid that is led to a supply passage 5 is led to a first annular groove section 8 through a first annular groove 7 formed in the spool S, and also led to a pressure compensation valve 9 from this first annular groove section 8. The working fluid passing through the pressure compensation valve 9 pushes and opens load check valves 10, 11 and flows into connecting flow passages 12, 13.

When the spool S is switched in the right direction, the connecting flow passage 12 and the one actuator port 3 communicate with each other through a second annular groove 14 of the spool S. Therefore, the working fluid flowing into the connecting flow passage 12 is supplied to the rod side chamber of the cylinder from the one actuator port 3.

The return working fluid from the bottom side chamber of the cylinder flows into the other actuator port 4. When the spool S is switched in the right direction, the other actuator port 4 and a return passage 16 communicating with a tank (not shown) communicate with each other through a third annular groove 15 of the spool S. Therefore, the return working fluid flowing into the other actuator port 4 is returned to the tank (not shown) from the return passage 16.

Meanwhile, when the spool S is switched in the left direction opposite to the above description, the working fluid that is led to a supply passage 6 is led to the first annular groove section 8 through the first annular groove 7, and also led to the pressure compensation valve 9 from this first annular groove section 8. The working fluid passing through the pressure compensation valve 9 pushes and opens the load check valves 10, 11 and flows into the connecting flow passages 12, 13.

When the spool S is switched in the left direction, the connecting flow passage 13 and the other actuator port 4 communicate with each other through the third annular groove 15 of the spool S. Therefore, the working fluid flowing into the connecting flow passage 13 is supplied to the bottom side chamber of the cylinder from the other actuator port 4.

The return working fluid from the rod side chamber of the cylinder flows into the one actuator port 3. When the spool S is switched in the left direction, the one actuator port 3 and the return passage 16 communicate with each other through the second annular groove 14 of the spool S. Therefore, the return working fluid flowing into the one actuator port 3 is returned to the tank (not shown) from the return passage 16.

Relief holes 17, 18 communicating with the actuator ports 3, 4 are formed in the valve body B1. Relief valves 19, 20 are assembled into the relief holes 17, 18.

The relief valves 19, 20 control load pressure of the cylinder connected to the actuator ports 3, 4. When the load pressure of the cylinder exceeds a pressure that is set in the relief valves 19, 20, the relief valves 19, 20 are opened, and the working fluid of the actuator ports 3, 4 is released to the return passage 16 via relief passages 21, 22.

On a side surface of the valve body B1 where an opening part of the actuator port 4 is formed, an assembling hole 23 for assembling an on/off valve V1 is provided. This assembling hole 23 is opened at a position to satisfy two position conditions of a position away from an imaginary line X passing through center of the actuator port 4, the imaginary line being parallel to the spool S, and a position in no contact with the actuator port 4 and the relief valve 20.

The assembling hole 23 formed as above is opened at the position in no contact with the actuator port 4 and the relief valve 20, and dug in the direction orthogonal to the spool S. The assembling hole 23 is also in no contact with the relief valve 20 in this digging direction.

The on/off valve V1 is assembled into such an assembling hole 23. The on/off valve V1 opens/closes a valve plug 25 by fastening and loosening a screw member 24.

As shown in FIG. 1, one end of a lead-in passage 26 that leads the working fluid to the on/off valve V1 is opened in the actuator port 4. This lead-in passage 26 is formed in parallel to the surface of the valve body B1 where the opening parts of the actuator ports 3, 4 are formed.

On the surface of the valve body B1 where the opening parts of the actuator ports 3, 4 are formed, one end of a communication hole 27 crossing and communicating with the lead-in passage 26 is also opened. An opening of the communication hole is closed by a plug 27a. Further, on a side surface of the valve body B1 where the relief valve 20 is provided, a communication port 28 crossing and communicating with the communication hole 27 is opened. An opening of the communication port is closed by a plug 28a.

The communication port 28 leads the working fluid in the lead-in passage 26 to the side of the valve plug 25. A passage hole 29 continuing to the assembling hole 23 is formed in the valve body B1. This passage hole 29 communicates with the relief passage 22 and the return passage 16 through a lead-out port 30.

When the screw member 24 of the on/off valve V1 is fastened, the valve plug 25 of the on/off valve V1 blocks communication between the communication port 28 and the passage hole 29. In other words, the on/off valve V1 blocks communication between the actuator port 4 and the return passage 16.

When the screw member 24 is loosened and the valve plug 25 is opened, the actuator port 4 communicates with the return passage 16 via the lead-in passage 26, the communication hole 27, the communication port 28, the on/off valve V1, the passage hole 29, the lead-out port 30, and the relief passage 22.

Therefore, even when the spool S is locked and the cylinder cannot be activated, by opening the on/off valve V1, the cylinder can be moved by self-weight or a load. Since the on/off valve V1 is provided at the position in no contact with the actuator port 4 and the relief valve 20, for example, the existing valve body B1 can be used without any change.

According to the first embodiment, the assembling hole 23 for assembling the on/off valve V1 communicates with the actuator port 4 and the relief passage 22. Thus, the working fluid in the actuator can be returned to the return passage 16 through the relief passage 22. Therefore, a flow passage that is formed in the valve body B1 can be minimized. Thus, a space for the on/off valve V1 can be reduced, and the on/off valve V1 can be provided in the reduced space.

The assembling hole for assembling the on/off valve V1 can be provided at the position in no contact with the actuator port 4 and the relief valve 20. Therefore, the valve body B1 does not have to be enlarged for providing the on/off valve V1, and the on/off valve V1 can be assembled into the existing valve body B1.

Second Embodiment

Figure 4:
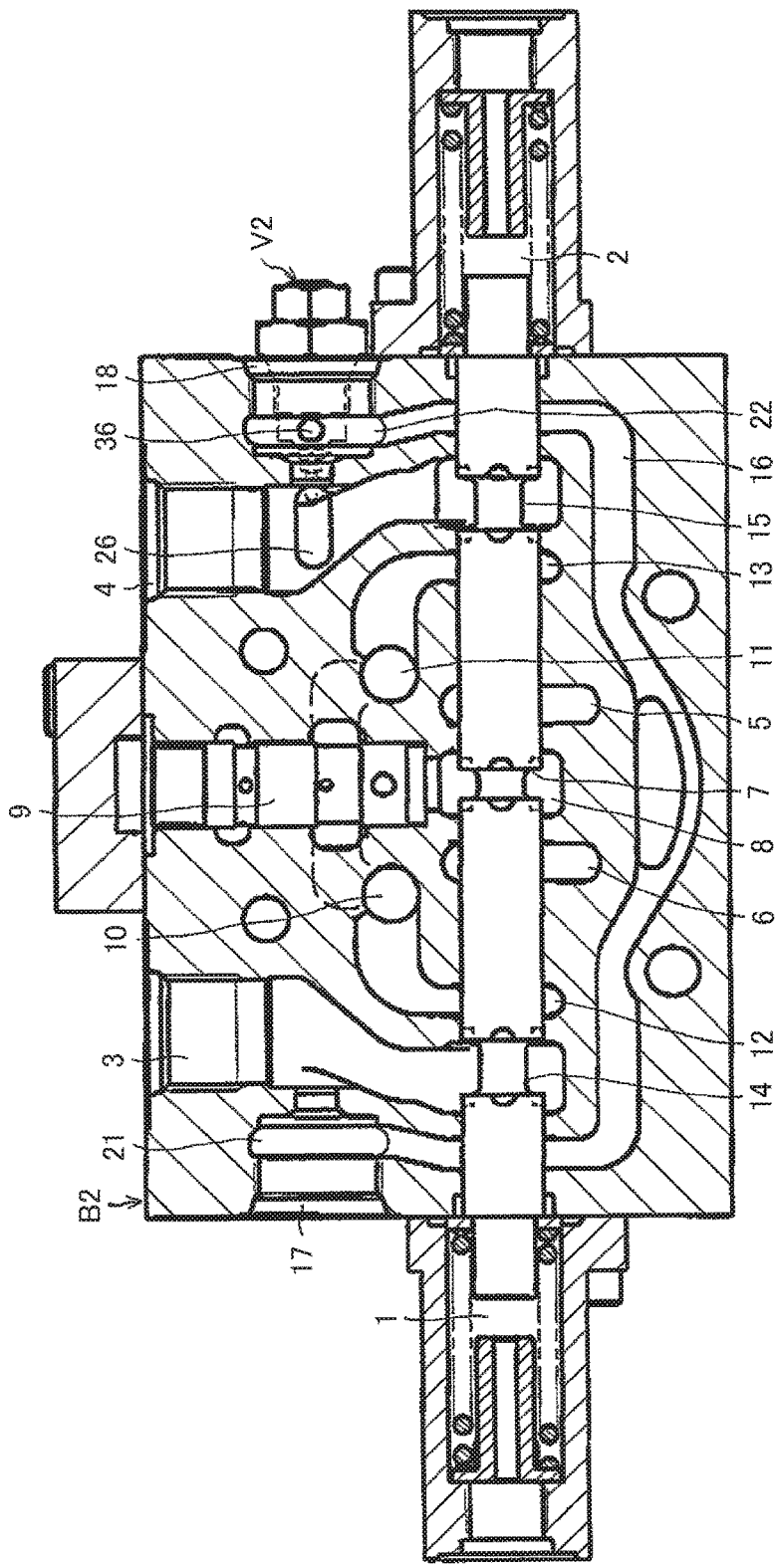
FIG. 4 is a sectional view of a second embodiment in a state where relief valves are detached.
Figure 5:
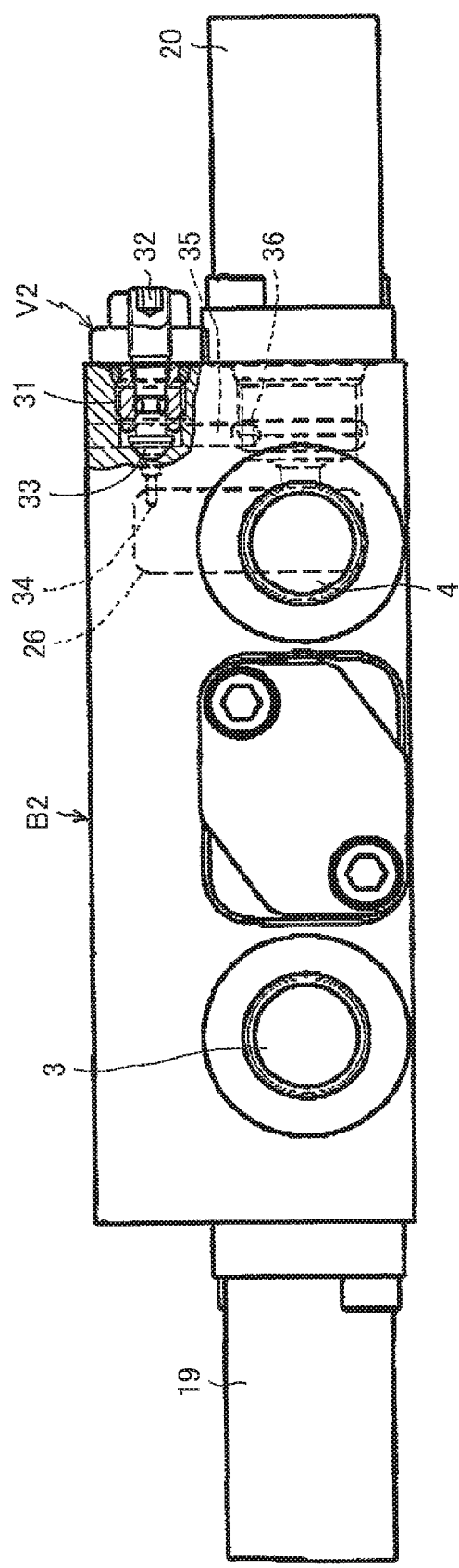
FIG. 5 is a plan view of the second embodiment in a state where the relief valves are attached, the view being seen from the opening side of actuator ports.
Figure 6:
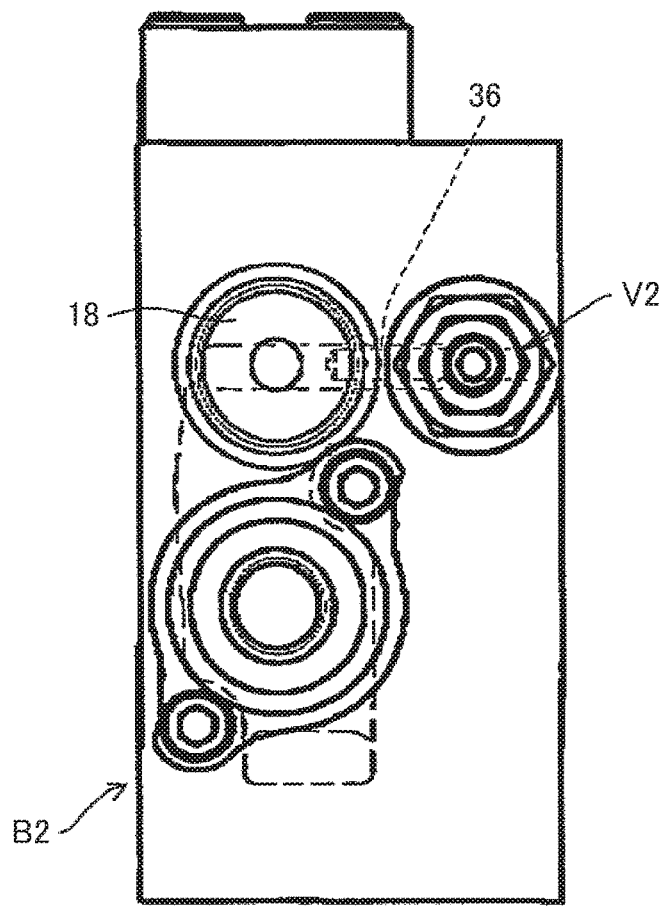
FIG. 6 is a side view of the second embodiment in a state where the relief valves are attached, the view being seen from the relief valve side.

In a second embodiment shown in FIGS. 4 to 6, an on/off valve V2 is assembled into a surface of a valve body B2 where a relief valve 20 is provided. As well as the first embodiment, a control valve device in the second embodiment includes a spool S configured to allow any one of actuator ports to communicate with a supply side and configured to allow other actuator port to communicate with a return side in accordance with switching. Therefore, in the description of the second embodiment, the same constituent elements as the first embodiment will be described with the same reference signs and detailed description thereof will be omitted.

On the surface of the valve body B2 where the relief valve 20 is provided, an assembling hole 31 for assembling the on/off valve V2 is provided. This assembling hole 31 is opened at a position shown in FIG. 5. That is, the assembling hole 31 is opened at the position to satisfy two position conditions of a position away from an imaginary line X passing through center of the actuator port 4, the imaginary line being parallel to the spool S, and a position in no contact with the actuator port 4 and the relief valve 20.

The depth direction of the assembling hole 31 formed as above is the direction parallel to a center line of the spool S, and the on/off valve V2 is assembled into this assembling hole 31. This on/off valve V2 opens/closes a valve plug 33 by fastening and loosening a screw member 32.

As well as the first embodiment, one end of a lead-in passage 26 is opened in the actuator port 4. This lead-in passage 26 crosses a communication port 34, and the lead-in passage 26 and the communication port 34 communicate with each other. Such a communication port 34 leads working fluid flowing into the lead-in passage 26 to the side of the valve body 33. A passage hole 35 continuing to the assembling hole 31 is formed in the valve body B2. This passage hole 35 communicates with the relief passage 22 and a return passage 16 through a lead-out port 36.

Therefore, also in the second embodiment, even when the spool S is locked and a cylinder cannot be activated, by opening the on/off valve V2, the cylinder can be moved by self-weight or a load.

Since the on/off valve V2 is provided at the position in no contact with the relief valve 20, for example, the existing valve body can be used without any change.

According to the second embodiment, as well as the first embodiment, the assembling hole 31 for assembling the on/off valve V2 communicates with the actuator port 4 and the relief passage 22. Thus, the working fluid in the actuator can be returned to the return passage 16 through the relief passage 22. Therefore, a flow passage that is formed in the valve body B2 can be minimized. Thus, a space where the on/off valve V2 is provided can be reduced, and the on/off valve V2 can be provided in the reduced space.

The assembling hole for assembling the on/off valve V2 can be provided at the position in no contact with the actuator port 4 and the relief valve 20. Therefore, the valve body B2 does not have to be enlarged for providing the on/off valve V2, and the on/off valve V2 can be assembled into the existing valve body B2.

Third Embodiment

Figure 7:
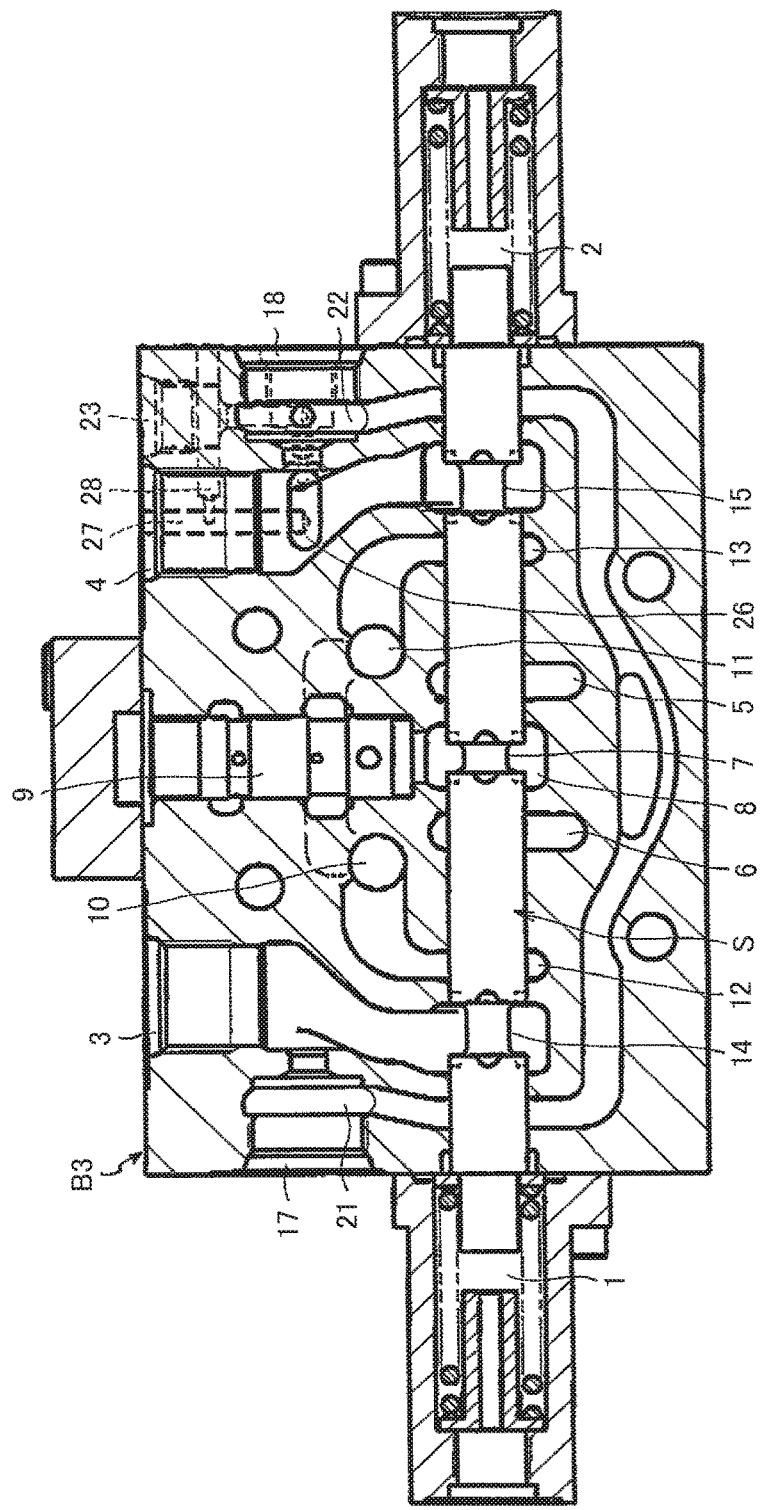
FIG. 7 is a sectional view of a third embodiment in a state where relief valves are detached.
Figure 8:
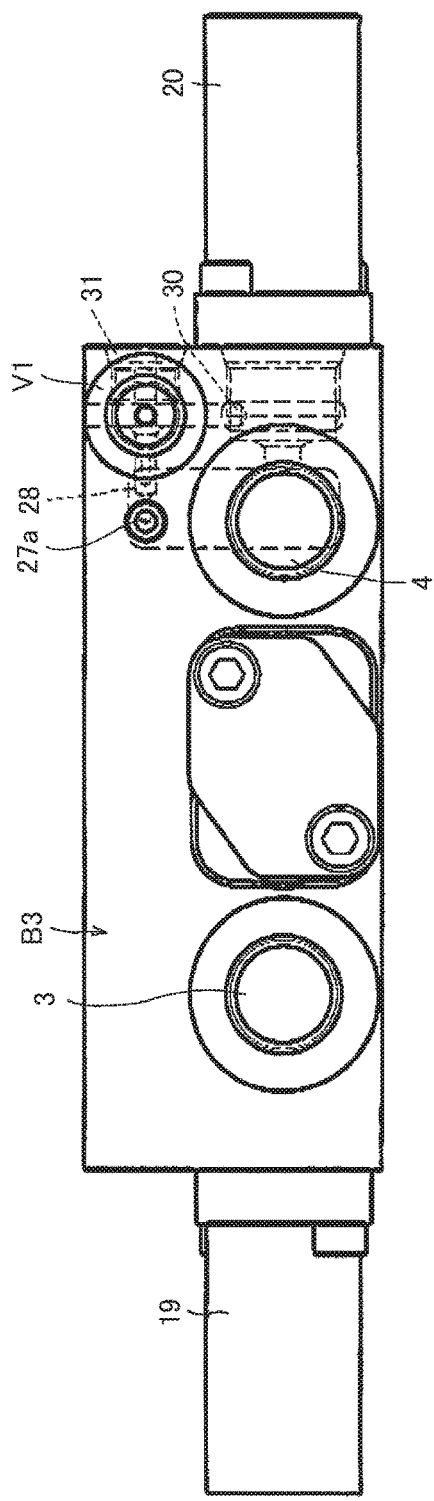
FIG. 8 is a plan view of the third embodiment in a state where the relief valves are attached, the view being seen from the opening side of actuator ports.
Figure 9:
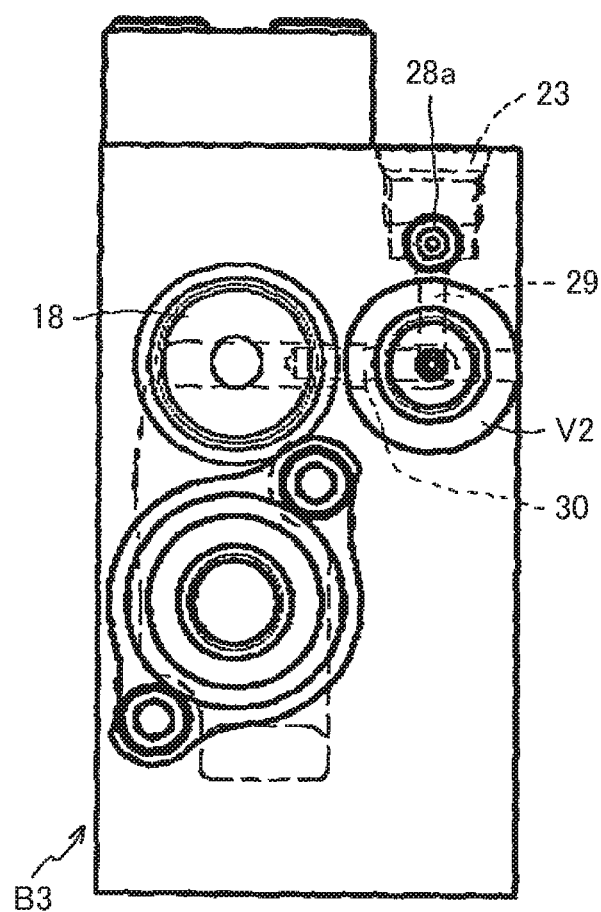
FIG. 9 is a side view of the third embodiment in a state where the relief valves are attached, the view being seen from the relief valve side.

In a third embodiment shown in FIGS. 7 to 9, a first on/off valve is provided as the on/off valve V1 in the first embodiment, and a second on/off valve is provided as the on/off valve V2 in the second embodiment. That is, in a control valve device in the third embodiment, both the first and second on/off valves V1, V2 in the first and second embodiments are provided in a valve body B3.

The valve body B3 has a first assembling hole as the assembling hole 23 in the first embodiment into which the first on/off valve V1 is assembled, and has a second assembling hole as the assembling hole 31 in the second embodiment into which the second on/off valve V2 is assembled.

Therefore, in the description of this third embodiment, the same constituent elements as the first and second embodiments will be described with the same reference signs and detailed description thereof will be omitted.

It should be noted that in each of FIGS. 7 to 9, a valve plug 25 of the first on/off valve V1 and a valve plug 33 of the second on/off valve V2 are not shown. The first assembling hole 23 and the second assembling hole 31 holding similar positional relationships to the first and second embodiments are provided in the valve body B3, and the valve plugs 25 and 33 (not shown) are assembled into these first and second assembling holes 23, 31. Such valve plugs 25 and 33 are opened/closed by fastening and loosening screw members 24 and 32 which are similar to the first and second embodiments. Configurations of these members are the same as the first embodiment.

As shown in FIG. 7, one end of a lead-in passage 26 that leads working fluid to the first on/off valve V1 is opened in the actuator port 4. A communication hole 27 crossing and communicating with the lead-in passage 26 is formed in the valve body B3, and an opening of the communication hole 27 is closed by a plug 27a. On a side surface of the valve body B3 where a relief valve 20 is provided, a communication port 28 crossing and communicating with the communication hole 27 is opened, and an opening of the communication port 28 is closed by a plug 28a.

The communication port 28 leads the working fluid in the lead-in passage 26 to the side of the valve plug 25. A passage hole 29 continuing to the first assembling hole 23 is formed in the valve body B3. The passage hole 29 communicates with the relief passage 22 and a return passage 16 through a lead-out port 30.

When the screw member 24 of the first on/off valve V1 is fastened, the valve plug 25 blocks communication between the communication port 28 and the passage hole 29. In other words, the first on/off valve V1 blocks communication between the actuator port 4 and the return passage 16.

When the screw member 24 is loosened and the valve plug 25 is opened, the actuator port 4 communicates with the return passage 16 via the lead-in passage 26, the communication hole 27, the communication port 28, the first on/off valve V1, the passage hole 29, the lead-out port 30, and the relief passage 22.

As clear from FIG. 9, the second assembling hole 31 into which the second on/off valve V2 is assembled is sufficiently distant from the first assembling hole 23 in the up and down direction, and the first and second on/off valves V1, V2 are not in contact with each other.

A communication port 34 and a passage hole 35 on the side of the second on/off valve V2 are also respectively displaced from the communication port 28 and the passage hole 29 on the side of the first on/off valve V1 in the up and down direction of FIG. 9. Therefore, the communication port 34 and the passage hole 35 are respectively not in contact with the communication port 28 and the passage hole 29.

However, the lead-out port 30 in the first embodiment and the lead-out port 36 in the second embodiment are made one common port in this third embodiment. In FIGS. 8 and 9, the one common lead-out port is denoted by the reference sign 30.

Also in this third embodiment, even when a spool S is locked and a cylinder cannot be activated, by opening any of the first on/off valve V1 and the second on/off valve V2, the cylinder can be moved by self-weight or a load. Furthermore, since both the first and second on/off valves V1, V2 are provided at the positions in no contact with the relief valve 20, for example, the existing valve body can be used without any change.

In this third embodiment, the first and second on/off valves V1, V2 are provided. Thus, in accordance with an installment situation of the control valve device, any of the first and second on/off valves V1, V2 can be appropriately used.

In the third embodiment, both the first and second on/off valves V1, V2 are assembled into the valve body B3. However, the present invention is not limited to this mode. Only one of the first and second on/off valves V1, V2 may be assembled into one assembling hole and other assembling hole for assembling the other on/off valve may be closed by a plug. In this case, the assembling holes can be appropriately used according to need.

According to the third embodiment, in addition to the effects of the first and second embodiments, the following effect is exerted. That is, by selectively utilizing the assembling holes 23, 31, it is possible to respond to an installment situation of the control valve device. For example, in a case where there is no attachment space for the on/off valve V1 on the opening side of the actuator ports 3, 4 of the control valve device, it is possible to respond to the case by using the assembling hole 31. In a case where there is no attachment space for the on/off valve V2 on the side of the surface where the relief valve 20 is provided, it is possible to respond to the case by using the assembling hole 23.

It should be noted that although the embodiments are premised on the control valve device including the pair of actuator ports 3, 4, the present invention can also be applied to for example a control valve device that controls a single-acting cylinder as a matter of course.

The present invention is the most suitable as a control valve device having a safety measure for a case where a spool is locked in a power shovel or the like.

Embodiments of this invention were described above, but the above embodiments are merely examples of applications of this invention, and the technical scope of this invention is not limited to the specific constitutions of the above embodiments.

This application claims priority based on Japanese Patent Application No. 2014-091671 filed with the Japan Patent Office on Apr. 25, 2014, the entire contents of which are incorporated into this specification.

The invention claimed is:

1. A control valve device, comprising:
  a valve body having
    first and second actuator ports connected to an actuator, a supply passage and a return passage for a working fluid, a relief passage configured to allow the first actuator port to communicate with the return passage,
an assembling hole, and
a relief hole connected to the relief passage;
a spool slidably assembled into the valve body, the spool being configured to allow the first actuator port to selectively communicate with the supply passage or the return passage and to allow the second actuator port to selectively communicate with the return passage or the supply passage;
a relief valve located in the relief hole, and being configured to open/close the relief passage to control a pressure of the first actuator port, and
an on/off valve assembled into an located in the assembling hole which is formed in the valve body, wherein
the on/off valve is configured to allow the first actuator port to communicate with the relief passage through the assembling hole at the time of valve open,
the assembling hole is provided at a position that
does not intersect an imaginary plane that includes both a center axis of the first actuator port and a center axis of the spool,
does not contact the first actuator port, and
does not contact the relief valve,
the second actuator port is provided on the imaginary plane; and
a center axis of the relief hole is located on the imaginary plane.

2. The control valve device according to claim 1, wherein the assembling hole is provided on a surface of the valve body where an opening of the first actuator port is formed.

3. The control valve device according to claim 1, wherein the assembling hole is provided on a surface of the valve body where the relief valve is provided.

4. The control valve device according to claim 1, further comprising a lead-in passage connecting between the on/off valve and the first actuator port, the lead-in passage being orthogonal to the imaginary plane.

5. The control valve device according to claim 1, further comprising a lead-out port connecting between the on/off valve and the relief passage, the lead-out being orthogonal to the imaginary plane.

* * * * *